United States Patent Office 3,312,617
Patented Apr. 4, 1967

3,312,617
ION EXCHANGE METHOD AND APPARATUS
Herschel A. Klein, Windsor, Conn., assignor to Combustion Engineering, Inc., Windsor, Conn., a corporation of Delaware
Filed Dec. 9, 1963, Ser. No. 329,087
8 Claims. (Cl. 210—35)

This invention relates to the ion exchange treatment of a solution and more particularly to a novel and improved water softening method and system employing a particular arrangement of softeners and a particular regenerating technique.

Conventional water softening systems employ cation exchange materials which comprises a complex molecule with an exchange site usually occupied by sodium. Both inorganic zeolites and organic resinous ion exchangers are used for this purpose. The hardness in the influent water which consists of the calcium and magnesium ions replaces the sodium in the ion exchanger, releasing this sodium in its place in the effluent solution. This chemical reaction is illustrated in Equation 1:

(1) $$Ca^{++} + Na_2Z \rightarrow CaZ + 2Na^+$$

The degree to which Equation 1 proceeds to completion is a function of how completely the exchange sites in the ion exchange material are converted to the sodium form. When the ion exchange material is no longer able to effectively exchange sodium for calcium it is considered to be exhausted and a regeneration step is required. This is accomplished by passing a salt solution (sodium chloride) through the bed to replace the hardness ions in the exchange material with the sodium in the salt solution. The reaction for regeneration is exactly the reverse of that illustrated in Equation 1, and is shown in Equation 2:

(2) $$2Na^+ + CaZ \rightarrow Na_2Z + Ca^{++}$$

The direction in which the reaction proceeds is a function of the ratio of sodium to calcium in the solution passing through the ion exchange material. When the ratio is extremely high, as during regeneration, sodium replaces the calcium in the ion exchange material and eliminates the hardness from the resin. During the service run the sodium to calcium ratio is much lower and the sodium in the resin replaces the calcium in the water.

In the operation of such a water softening system, it is conventional to pass the hard water downwardly through the exchange column containing the exchange material until the effluent water is no longer of the required purity. This will occur sometime before the exchange material has been completely exhausted or converted to what will be referred to as the calcium form. The exchange material on the top of the column at that time will be substantially completely converted to the calcium form while some of the exchange material in the bottom will remain in the sodium form. Because each ion exchange bead represents an individual softener, the last particles of ion exchange material contacted by the water are critical since they establish the final equilibrium and determine the quality of the effluent from the standpoint of residual hardness. For economic reasons the regenerating solution is conventionally passed downwardly through the ion exchange material. This results in the elimination of hardness first from the upper portion of the bed and successively from the lower portions of the bed. Therefore, with conventional regeneration the lowest portion of the bed contains the highest percentage of hardness in the ion exchange sites. For this reason the residual hardness in the effluent is not as low as might otherwise be obtained.

Conventionally designed and operated softeners employing exchange materials of the high capacity styrene resin type and using downflow regeneration may remove about 98 or 99 percent of the hardness from the water. With a typical feedwater, this would mean that the effluent might contain from 1 to 5 p.p.m. hardness. To obtain purities less than 1 p.p.m. which are occasionally required for equipment such as modern industrial boilers, other techniques must be resorted to.

One method of reducing the hardness leakage is to use a greater quantity of salt than is normally used to regenerate. This results in a greater over-all conversion of all the sites in the resin bed to the sodium form. However, the additional salt required to reduce hardness leakage to the low values does not produce a proportionate increase in softening capacity. In other words, the kilograins of hardness removed per lb. of salt used (regeneration efficiency) is less at higher regeneration levels. The regeneration efficiency determines the specific operating costs of the softening process and for this reason the use of high regeneration levels to obtain a low leakage of hardness is seldom economically feasible in an ordinary softener.

Another method of reducing the hardness leakage is to use upflow regeneration, that is, regenerating by introducing the regenerating solution at the bottom of the column, flowing it up through the exchange material and withdrawing it from the top of the column. Downflow regeneration has the disadvantage of washing all of the calcium and magnesium ions over the exchange material at the bottom of the column which will tend to leave some residual hardness in the exchange material at the bottom and cause hardness leakage into the effluent water upon subsequent operation of the system. Upflow regeneration on the other hand will leave any residual hardness at the top of the exchange column where it will not effect the effluent water. However, upflow regeneration is inherently an inefficient operation. The upflowing regenerating solution tends to unpack or expand the bed of exchange material considerably since the specific gravity of some of the exchange materials is only about 1.05. The unpacking of the bed results in poor contact between the exchange material and the salt solution and thus inefficient utilization of the salt. Therefore, large quantities of salt must be used and the cost is high compared to the amount of hardness removed. Special units have been designed to more effectively accommodate upflow regeneration but they all involve additional capital expense.

Primary softeners, that is, softeners which treat the raw incoming water, require frequent regeneration since they remove the majority of the hardness. Since large quantities of salt would be necessary at these frequent intervals for either high level downflow regeneration or for upflow regeneration, these regenerating techniques are not economically practical for primary softeners. It was because of these difficulties that the present invention was developed.

An object of the present invention is to utilize ion exchange procedures and apparatus in a novel manner to effect a more complete ion exchange.

It is a further object of the invention to employ ion exchange units connected in a novel arrangement and operating in a novel manner to increase the ion exchange capacity of the system while the regeneration efficiency of the over-all system is improved and the operating cost reduced.

Another object is to provide a water softening system arranged for a novel type of regeneration to assure a consistent low hardness effluent which could not be economically obtained in a conventional system. The invention also serves as a safety factor in the event that a primary softener is inadvertently over-run.

The objects of this invention are realized by first treating the hard water in one or more parallel primary softeners that have been regenerated in a conventional manner. The effluent from the primary softeners is then treated in a special highly regenerated "polishing" softener to further reduce the hardness to the desired level.

If a single polishing softener is used in conjunction with one or more primary softeners in which the majority of the hardness is removed, the polishing softener will have a low load placed upon it and it will require regeneration at infrequent intervals compared to the primary softeners. Since the polishing softener is only regenerated infrequently, inefficient regeneration techniques can be employed which will however serve to more completely convert the exchange material back to the sodium form. Such a system utilizes the cost advantages of low level downflow regeneration in the primary units as well as the advantages of high level regeneration in the polishing unit.

Conventional softeners are generally designed for flow rates of about six gallons per minute per square foot in the column to assure low leakage and reasonable service runs. Because of the low influent hardness, a polishing softener can be operated satisfactorily at five times this rate. Field data reveals that an effluent consistently less than 0.1 p.p.m. hardness could be produced at flows as high as 30 g.p.m./ft.² in the polisher. On this basis, one polishing softener can service five primary softeners of equal size.

Two basic procedures may be employed to obtain high level regeneration in the polishing softener. One is to use a large amount of salt and the other is to use upflow regeneration. It is preferable to use both techniques in conjunction to reach the required state of almost complete conversion to the sodium form.

The objects and advantages of the present invention will be more readily apparent from the following description of an illustrative embodiment of the invention when read in conjunction with the accompanying drawings wherein.

Figure 1:
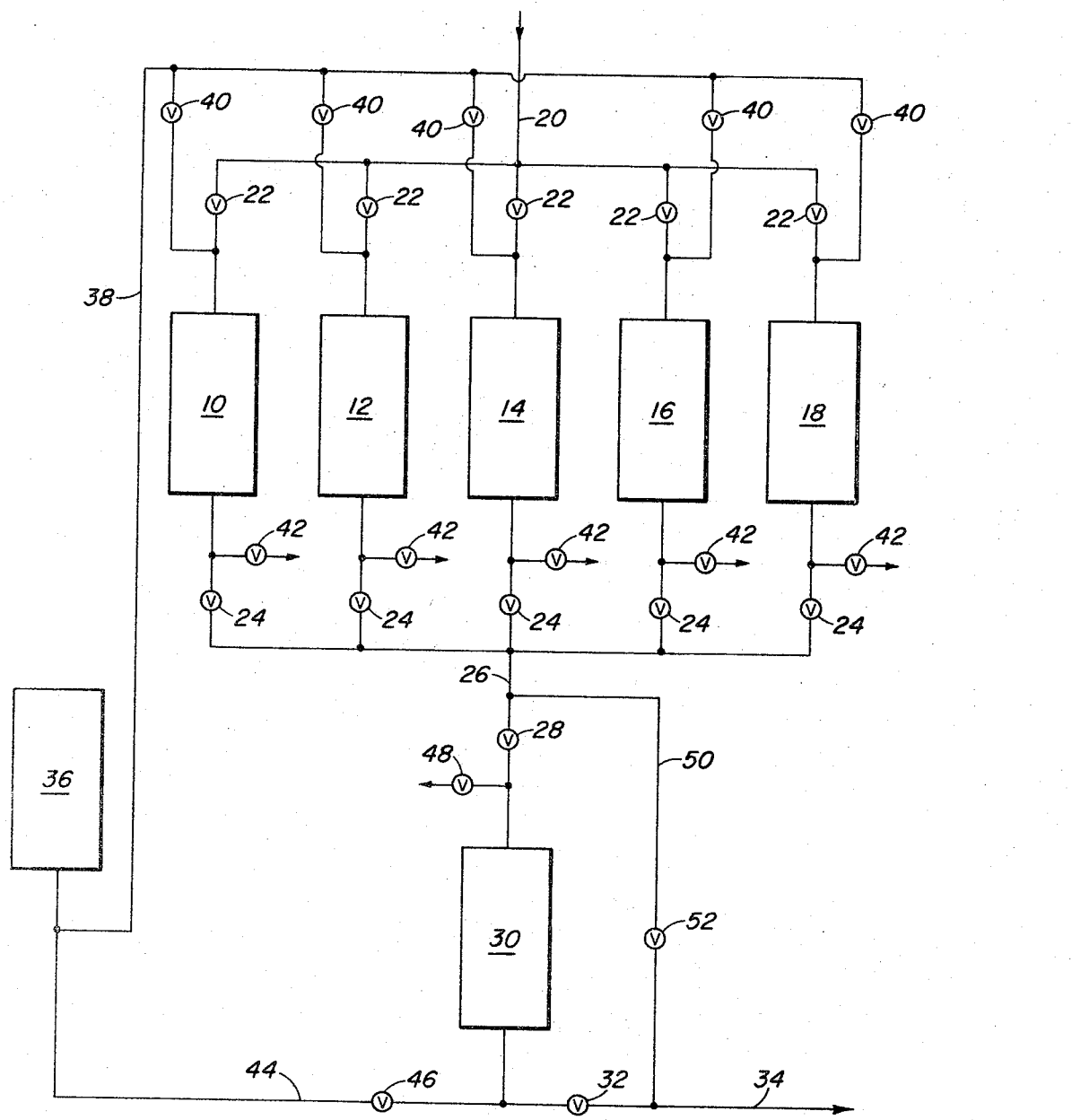
FIG. 1 is a diagrammatical flow sheet of a system comprising primary and polishing softeners in accordance with the present invention.

The system as shown in FIG. 1 comprises a plurality of primary softeners 10, 12, 14, 16 and 18, all constructed in a conventional manner and connected in parallel. The raw feedwater is fed to these primary softeners via feed line 20 and valves 22. The water flows downwardly through the softeners and the effluent is taken out of the bottom through the valves 24 and via line 26 to valve 28 at which point the effluents from each primary unit have been combined. The combined effluent from the primary softeners with most of the hardness removed is then fed from valve 28 to the polishing softener 30. The water will flow downwardly through the polishing softener and the finally treated water is fed from the bottom of the polishing column through valve 32 to exit line 34.

The system would normally be designed so that one of the primary softeners could be off-line and in a regeneration cycle while the other primary softeners are carrying the required softening load. Thus, softener 10 for instance, could be taken off-line by closing its associated valves 22 and 24 while softeners 12, 14, 16, 18 and 30 are still in a service cycle.

The regenerating solution is stored in tank 36 and is conducted to the primary softeners via line 38 and the valves 40. When softener 10 is being regenerated, its associated valve 40 is open to admit regenerating solution while valve 22 is closed to keep out the raw water. The regenerating solution flows down the column and out the valve 42 while valve 24 is closed. The spent regenerating solution is then disposed of. Each of the primary softeners would be regenerated in a like manner at the appropriate time. The polishing softener is regenerated with solution also taken from tank 36 via line 44 through valve 46 to the bottom of the polishing softener 30. The regenerating solution flows up through the exchange material and out the top through valve 48 after which it is disposed of. During the regeneration of the polishing softener, valves 28 and 32 are closed.

If the equipment to which the softened water is being supplied can take water of the purity furnished by the primary softeners alone for a short period of time at infrequent intervals, it may be possible to merely bypass the polishing softener while it is being regenerated. For this purpose line 50 and valve 52 are provided. When valves 28 and 32 are closed to regenerate the polishing softener, valve 52 is opened to bypass the polishing softener. If the equipment to which the water is being supplied cannot take water as treated by the primary softeners alone, it will be necessary to furnish an auxiliary polishing softener or to shut down the entire system while the polishing softener is being regenerated.

Figure 2:
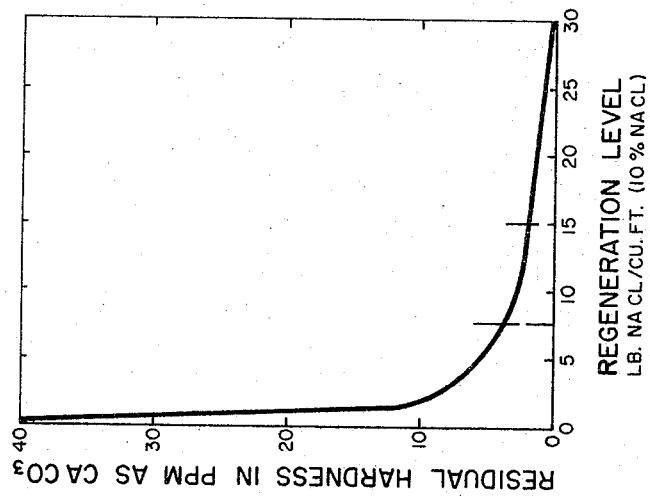
FIG. 2 is a graph showing the residual hardness in the finally treated water versus the regeneration level.
Figure 3:
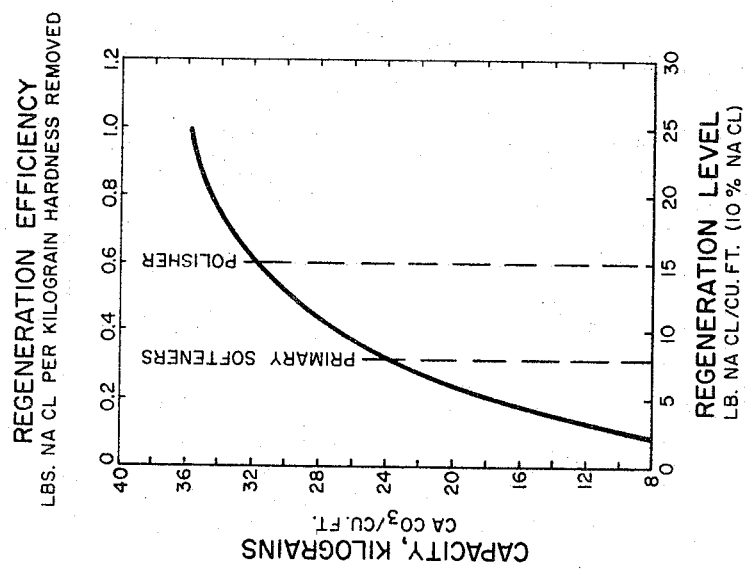
FIG. 3 is a graph showing the relationship between regeneration level, regeneration efficiency and capacity.

FIGS. 2 and 3 are typical curves showing the relationship between the regeneration level expressed as pounds of salt added per cubic foot of ion exchange material, and the efficiency, capacity and residual hardness.

Typical operating points for primary and polishing softeners have been indicated on the graph of FIG. 3. The curve in FIG. 2 represents the conditions for raw feedwater of a particular hardness. This latter curve will change for varying feedwater hardness, and since the water being fed to the polishing softener has very little hardness, its curve would be considerably different. But the curve of FIG. 2 does indicate the general relationship of changes in the regeneration level to changes in residual hardness. Laboratory studies have indicated that if a softener is regenerated with 30 pounds of salt per cubic foot of resin, hardness leakage is reduced to 0.1 p.p.m. as $CaCO_3$.

At high regeneration levels the curve as shown in FIG. 3 tends to flatten out, indicating a reduction in regeneration efficiency, i.e., a large amount of NaCl is required per kilograin of hardness removed. Note that for each kilograin of hardness removed, the polishing softener indicated on the graph requires about twice as much salt as the primary softener. The graph of FIG. 3 also indicates that at high regeneration levels, the capacity of the system for removing hardness is not increased appreciably for a considerable increase in regeneration level in contrast to the increase in capacity at low regeneration levels. It can be seen that the capacity of the polishing softener is considerably greater than that of the primary softeners, although its regeneration efficiency is much lower. The curve of FIG. 2 indicates that at high regeneration levels above about eight pounds of salt per cubic foot of exchange material, the change in residual hardness in the effluent water changes very little with increasing amounts of salt. Thus, it takes only about eight pounds of salt per cubic foot to bring the hardness down to 2.5 p.p.m. expressed as $CaCO_3$ whereas it would take another seven pounds to bring it down another 1 p.p.m.

In addition to providing an effluent water of much lower hardness than possible with primary softeners alone, the present invention can also effect a savings in operating cost. This savings will tend to offset the approximate 20 to 30 percent additional capital expenditure for the polishing softener. The amount of salt solution used to regenerate the primary softeners can be reduced to a slight extent without significantly affecting the quality of their output, as can be clearly seen in FIG. 1, and without seriously affecting the capacity as shown in FIG. 2. The salt saved from all of the primary softeners over the period between regenerations of the polishing softener will make up enough salt to regenerate the polishing softener and probably more.

The following examples will illustrate the savings involved:

EXAMPLE 1

Five primary softeners each having 25 cu. ft. of exchange material with no polishing softener were operated at a regeneration level of 15 lbs. NaCl per cu. ft. of exchange material to obtain a residual hardness of approximately 1.5 p.p.m. (expressed as $CaCO_3$) from raw water containing 1,000 p.p.m. hardness. All five of the softeners had to be regenerated after the system had passed 62,500 gallons. The cost per cycle of softening would be (cu. ft. of resin) × (lbs. of salt per cu. ft. of resin) × (cost of salt) = $25 \times 5 \times 15 \times .02 = \$37.50$ per 62,500 gallons. This amounts to $0.60 per 1,000 gallons.

EXAMPLE 2

Five primary softeners each having 25 cu. ft. of exchange material were operated at a regeneration level of 8 lbs. of NaCl per cu. ft. of exchange material to obtain a residual hardness of approximately 3.5 p.p.m. from raw water of 1,000 p.p.m. hardness. The combined effluent from these primary softeners was fed to a polishing softener also containing 25 cu. ft. of exchange material which was regenerated at a level of 15 lbs. of NaCl per cu. ft. to obtain a residual hardness which was negligible or essentially zero. The cost per cycle of the primary softeners was equal to $25 \times 5 \times 8 \times .02 = \$20$ per 50,000 gallons since regeneration of all five primary units was necessary after the passage of 50,000 gallons. This is equal to $0.40 per 1,000 gallons. It was necessary to regenerate the polishing softener after 3,750,000 gallons and the cost was $25 \times 15 \times .02 = \$7.50$ per 3,750,000 gallons. This amounts to $0.002 per 1,000 gallons. The total operating cost in this case would therefore be $0.402 per 1,000 gallons. The economic advantage of a polishing softener following a plurality of primary softeners as opposed to single step softening is therefore seen to be quite favorable.

The invention has an additional advantage in that if any one of the primary softeners is permitted to operate longer than its normal period between regenerations the polishing softener will serve as a back up and prevent the effluent from the over-run primary softener from getting into the equipment.

While one preferred embodiment of the invention has been shown and described, it will be understood that such showing is illustrative rather than restrictive and that changes in the construction and arrangement of parts and steps may be made without departing from the spirit and scope of the invention as claimed.

I claim:

1. The method of ion exchange treatment of a solution comprising the steps of:
   (a) passing the solution through primary ion exchange means to obtain partially treated solution,
   (b) passing the partially treated solution from said primary ion exchange means through polishing ion exchange means,
   (c) regenerating said primary ion exchange means to a first level of regeneration and
   (d) regenerating said polishing ion exchange means to a second level of regeneration higher than said first level.

2. The method of ion exchange treatment of a solution comprising the steps of:
   (a) passing the solution through a plurality of primary ion exchange means connected in parallel to obtain partially treated solution,
   (b) passing the partially treated solution from said plurality of primary ion exchange means through polishing ion exchange means to obtain fully treated solution,
   (c) regenerating said primary ion exchange means to a first level of regeneration, and
   (d) regenerating said polishing ion exchange means to a second level of regeneration higher than said first level.

3. The method of ion exchange treatment of a solution comprising the steps of:
   (a) passing the solution in one direction through primary ion exchange means,
   (b) passing the effluent solution from said primary ion exchange means in one direction through polishing ion exchange means,
   (c) regenerating the primary ion exchange means at necessary intervals by passing therethrough regenerating material in the same direction as said solution passed therethrough, and
   (d) regenerating said polishing ion exchange means at necessary intervals by passing therethrough a regenerating material in a direction opposite to the direction said effluent solution passed therethrough.

4. The method of ion exchange treatment of a solution comprising the steps of:
   (a) passing the solution downwardly through a primary ion exchange column,
   (b) passing the effluent partially treated solution from said primary ion exchange column downwardly through a polishing ion exchange column to obtain fully treated solution,
   (c) regenerating said primary ion exchange column at necessary intervals by passing a regenerating material downwardly through said primary ion exchange column, and
   (d) regenerating said polishing ion exchange column at necessary intervals by passing said regenerating material upwardly through said polishing ion exchange column.

5. A method of ion exchange treatment of a solution comprising the steps of:
   (a) passing the solution downwardly through a plurality of primary ion exchange units connected in parallel to obtain partially treated solution,
   (b) passing the partially treated solution from all of said primary units downwardly through a single polishing ion exchange unit to further treat the solution,
   (c) upon exhaustion of any one of said plurality of primary units, passing a regenerating solution downwardly through said one primary unit, and
   (d) upon exhaustion of said polishing ion exchange units, passing a regenerating solution upwardly through said polishing unit.

6. The method of ion exchange treatment of a solution comprising the steps of:
   (a) passing the solution through a plurality of primary ion exchange units connected in parallel to obtain partially treated solution,
   (b) passing the partially treated solution from all of said primary units through a single polishing ion exchange unit to further treat the solution,
   (c) regenerating each of said primary units to a first level of regeneration at predetermined intervals, and
   (d) regenerating said polishing unit to a second level of regeneration higher than said first level at predetermined intervals.

7. Apparatus for the ion exchange treatment of a solution comprising a plurality of primary ion exchange means connected in parallel, a polishing ion exchange unit, means to feed raw water to said parallel primary ion exchange means, means to combine and feed the effluent water from said primary ion exchange means to said polishing ion exchange unit, means to withdraw fully treated water from said polishing ion exchange unit, means to regenerate said primary ion exchange means to a first level of regeneration and means to regenerate said polishing ion exchange unit to a level of regeneration higher than said first level.

8. Apparatus for the ion exchange treatment of a solution comprising a plurality of primary ion exchange means each having first and second ends, polishing ion exchange means having first and second ends, means to feed solution to the first ends of said primary ion exchange means, means to conduct the partially treated effluent from the second ends of said primary ion exchange means to the first end of said polishing ion exchange means, means to discharge the fully treated effluent from the second end of said polishing ion exchange means, means to supply a regenerating material to the first ends of said primary ion exchange means so that the regenerating material will pass therethrough in the same direction as said solution passed therethrough and means to supply a regenerating material to the second end of said polishing ion exchange means so that the regenerating material will pass therethrough in the direction opposite to that in which the working solution passed therethrough.

References Cited by the Examiner

UNITED STATES PATENTS

| | | | |
|---|---|---|---|
| 2,609,341 | 9/1952 | Juda | 210—31 |
| 3,194,683 | 7/1965 | Grosvenor et al. | 210—33 |

MORRIS O. WOLK, *Primary Examiner.*

E. G. WHITBY, *Examiner.*